US012498625B2

(12) United States Patent
Yeh et al.

(10) Patent No.: US 12,498,625 B2
(45) Date of Patent: Dec. 16, 2025

(54) PROJECTOR DEVICE WITH MULTI-ANGLE PROJECTION

(71) Applicant: Coretronic Corporation, Hsin-Chu (TW)

(72) Inventors: Cheng-Yu Yeh, Hsin-Chu (TW); Tung-Yi Ko, Hsin-Chu (TW); Wen-Yen Chung, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 478 days.

(21) Appl. No.: 17/993,871

(22) Filed: Nov. 24, 2022

(65) Prior Publication Data

US 2023/0194968 A1    Jun. 22, 2023

(30) Foreign Application Priority Data

Dec. 16, 2021    (CN) .......................... 202111541316.8

(51) Int. Cl.
*G03B 21/16*    (2006.01)
*G03B 21/00*    (2006.01)
(Continued)

(52) U.S. Cl.
CPC ............. *G03B 21/16* (2013.01); *G03B 21/00* (2013.01); *G03B 21/14* (2013.01); *G03B 21/145* (2013.01); *G03B 21/54* (2013.01)

(58) Field of Classification Search
CPC ........ G03B 21/16; G03B 21/00; G03B 21/14; G03B 21/145; G03B 21/54
(Continued)

(56) References Cited

U.S. PATENT DOCUMENTS

| 6,769,778 B1 * | 8/2004 | Lloyd | G09B 27/06 434/285 |
| 2013/0010268 A1 * | 1/2013 | Nishima | G03B 21/16 353/52 |

(Continued)

FOREIGN PATENT DOCUMENTS

| CN | 102830580 | 12/2012 |
| CN | 102902142 | 1/2013 |

(Continued)

OTHER PUBLICATIONS

"Office Action of China Counterpart Application", issued on May 30, 2025, p. 1-p. 8.

*Primary Examiner* — Magda Cruz
(74) *Attorney, Agent, or Firm* — JCIPRNET

(57) ABSTRACT

A projector device including a first body, a second body that the first body stacked on, a rotating shaft connecting the first and the second bodies, a projection lens module arranged in the first body and having a projection optical axis not parallel to the rotating shaft, an optical engine module arranged in the first body for providing a projection beam along the projection optical axis, a heat sink, and a fan is provided. The rotating shaft is located on a virtual plane parallel to the projection optical axis. The heat sink and the fan are arranged in the first body and beside the optical engine module. The fan and at least one-half of the heat sink are located on a first side of the virtual plane, and the projection lens module is located on a second side opposite to the first side of the virtual plane.

14 Claims, 8 Drawing Sheets

(51) Int. Cl.
*G03B 21/14* (2006.01)
*G03B 21/54* (2006.01)

(58) Field of Classification Search
USPC .......................................................... 353/57
See application file for complete search history.

(56) References Cited

U.S. PATENT DOCUMENTS

| | | | | |
|---|---|---|---|---|
| 2015/0009218 | A1* | 1/2015 | Fukutomi et al. ... | H04N 9/3188 |
| | | | | 345/428 |
| 2020/0183263 | A1* | 6/2020 | Chien et al. ....... | G03B 21/2013 |
| 2021/0318598 | A1* | 10/2021 | Liu et al. ............... | G03B 21/16 |

FOREIGN PATENT DOCUMENTS

| | | | | |
|---|---|---|---|---|
| CN | 205899229 | | 1/2017 | |
| CN | 210983018 | | 7/2020 | |
| JP | 07295097 | A * | 11/1995 | ............. G03B 21/16 |
| JP | 2009080146 | A * | 4/2009 | ............. G03B 21/16 |
| JP | 2011107283 | A * | 6/2011 | ............. G03B 21/00 |
| TW | 201305710 | | 2/2013 | |

\* cited by examiner

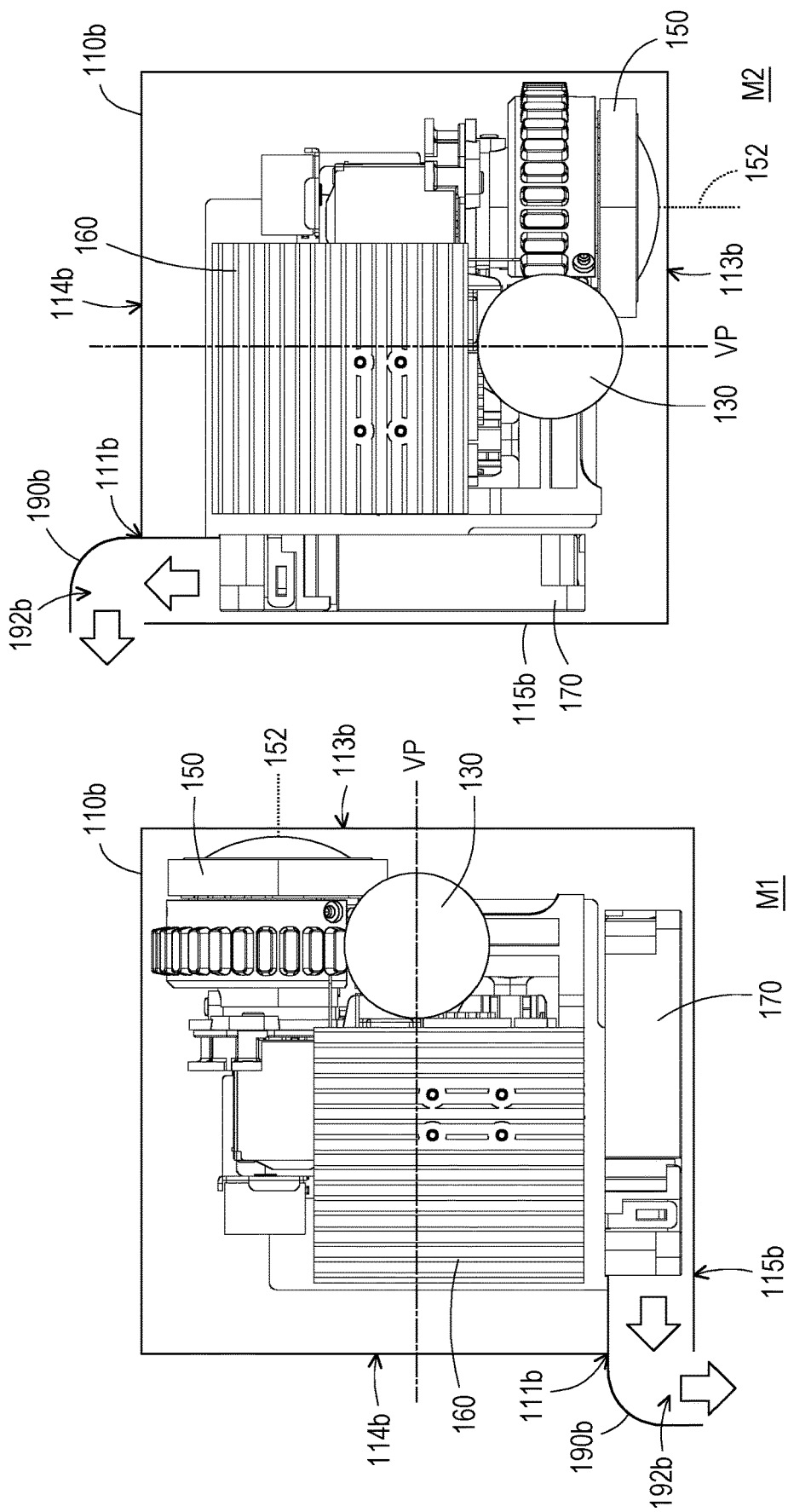

PROJECTOR DEVICE WITH MULTI-ANGLE PROJECTION

CROSS-REFERENCE TO RELATED APPLICATION

This application claims the priority benefit of China application serial no. 202111541316.8 filed on Dec. 16, 2021. The entirety of the above-mentioned patent application is hereby incorporated by reference herein and made a part of this specification.

BACKGROUND

Technical Field

The invention relates to a projector device.

Description of Related Art

As projection systems are becoming more widely used, more and more products are not limited to a single function, but rather are beginning to move towards a composite way of use. For example, installing a projector device as a secondary system on the main system (for example, a smart bluetooth speaker), so that images can be projected synchronously when playing multimedia or music, so as to obtain a better user experience. In order to match the characteristics of portability of the product and the projection position of the projector device, the demand for multi-angle projection arises accordingly. For example, the projection direction changes in multiple angles and directions, additionally, the projector device is not limited to projecting onto the wall, to suit a variety of projection occasions.

In order to minimize the thickness of current projector devices, the optical engine and the heat dissipation system (for example, the heat sink and the fan) are usually arranged in a flat housing. However, it is necessary to rotate the projector device when performing multi-angle projection. When the current projector device is rotated relative to a portable main system (for example, rotated by ninety degrees), the center of gravity of the projector device will transfer from inside the range of the original main system body to outside the range of the main system body, which makes the projector device easy to tip and become unstable, thus the projector device is unable to achieve multi-angle projection. Therefore, a way for the main system and the secondary system to relatively rotate without tipping or becoming unstable is a problem that needs to be solved urgently in the field.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The present invention provides a projector device. The fan and at least one-half of a heat sink arranged in a first body are located on a second side of a virtual plane, and a projection lens module arranged in the first body is located on a first side of the virtual plane, so that in the case where the first body is rotated relative to the second body through a rotating shaft, the second body is not tipped or unstable, therefore the projector device achieves a function of multi-angle projection.

The other objectives and advantages of the present invention may be further understood from the descriptive features disclosed in the present invention.

In order to achieve one of, parts of, or all of the above objectives or other objectives, the projector device of the present invention is characterized by comprising a first body, a second body, a rotating shaft, an optical engine module, a projection lens module, a heat sink, and a fan. The first body is stacked on the second body. The first body and the second body are connected by the rotating shaft, and the first body is rotated relative to the second body through the rotating shaft. The optical engine module is arranged in the first body for providing a projection beam. The projection lens module is arranged in the first body and has a projection optical axis for projecting the projection beam out of the first body along the projection optical axis. The rotating shaft is located on a virtual plane, the virtual plane is parallel to the projection optical axis, and the projection optical axis is not parallel to the rotating shaft. The heat sink and the fan are arranged in the first body and beside the optical engine module. The fan and at least one-half of the heat sink are located on a first side of the virtual plane, and the projection lens module is located on a second side of the virtual plane. The first side and the second side are opposite sides of the virtual plane.

Based on the above, in the projector device of the present invention, at least one-half of the heat sink and the fan provided in the first body are located on the first side of the virtual plane, and the projection lens module provided in the first body is located on the second side of the virtual plane, so that in the case where the first body is rotated relative to the second body through a rotating shaft, the second body is not tipped or unstable. In the situation where the first body is rotated, the projection optical axis of the projection lens module is also rotated, and the projection beam is projected out of the first body along the direction of the projection optical axis, so that the projector device achieves a function of multi-angle projection.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 3A is a side view of some components of a projector device according to another embodiment of the invention.

FIG. 3B is a side view of some components of the projector device of FIG. 3A in another state.

DETAILED DESCRIPTION OF DISCLOSED EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
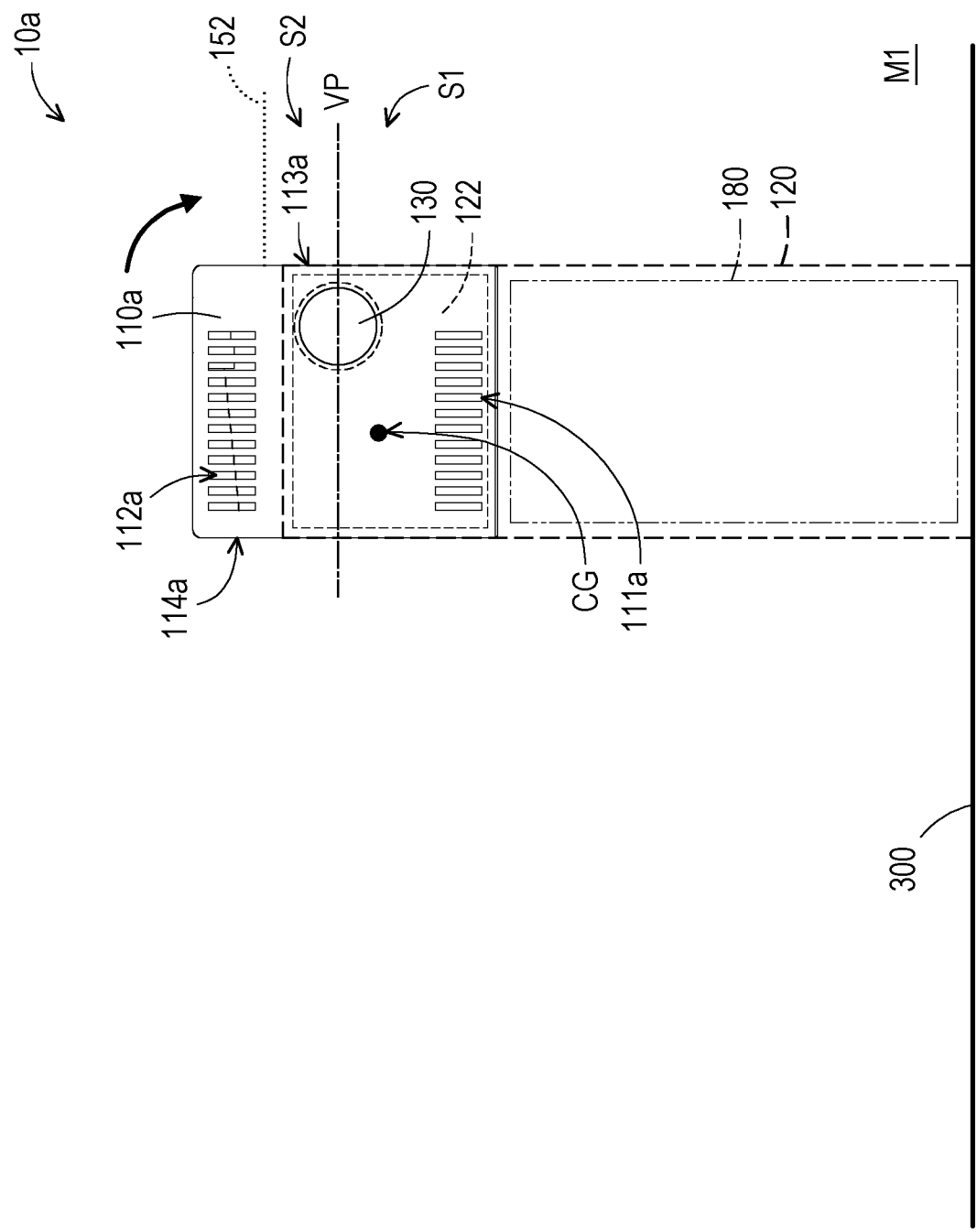
FIG. 1A is a structural side view of a projector device according to an embodiment of the invention.
Figure 1B:
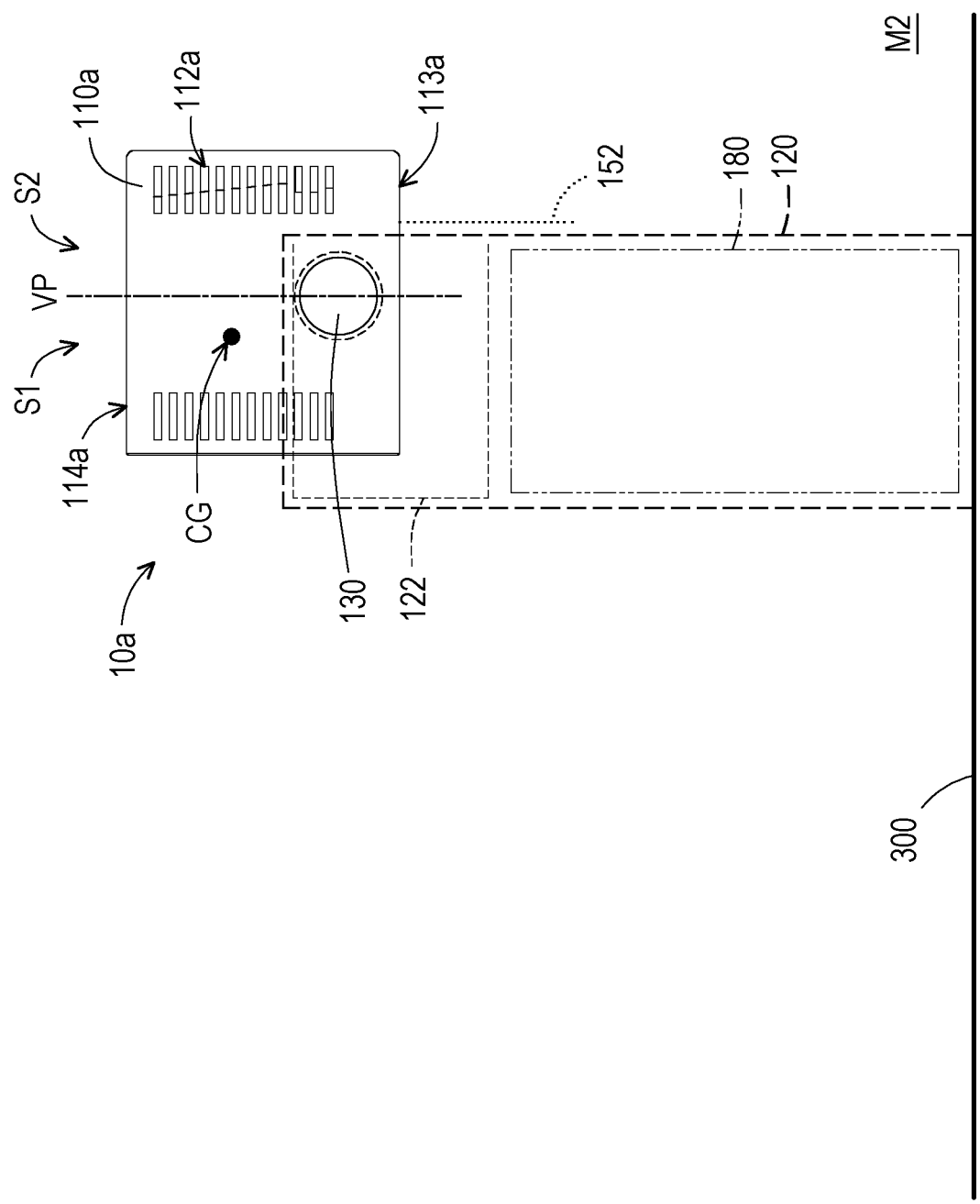
FIG. 1B is a side view of the projector device of FIG. 1A in another state.
Figure 1C:
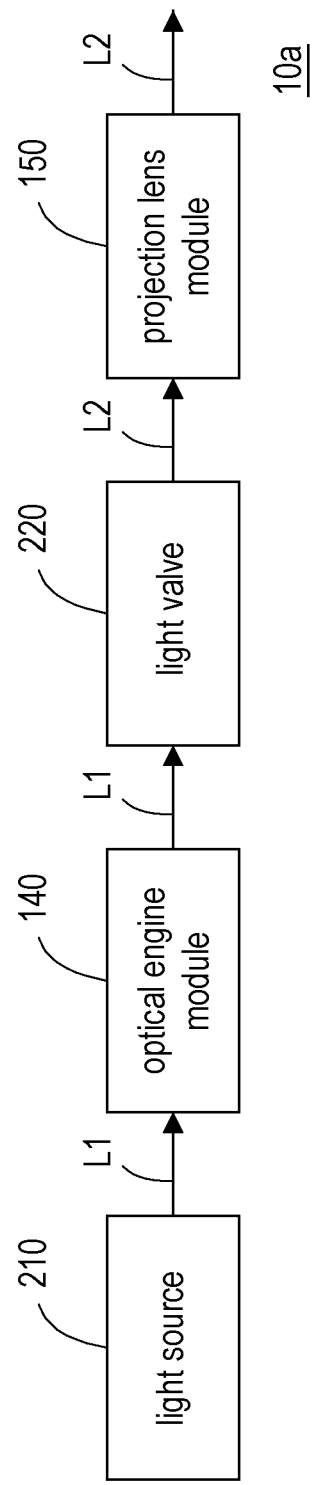
FIG. 1C is a block diagram of the optical system of the projector device of FIG. 1A.

FIG. 1A is a structural side view of a projector device according to an embodiment of the invention. FIG. 1B is a side view of the projector device of FIG. 1A in another state. FIG. 1C is a block diagram of the optical system of the projector device of FIG. 1A. Referring to FIGS. 1A, 1B and 1C at the same time, a projector device 10a of this embodiment is configured to stand on a platform 300, and the projector device 10a includes a first body 110a, a second body 120 and a rotating shaft 130. The first body 110a is stacked on the second body 120. The second body 120 includes a bracket 122. The second body 120 stands on the platform 300 and is connected to the first body 110a by the bracket 122 and the rotating shaft 130. The first body 110a is rotated relative to the second body 120 by the rotating shaft 130, so that the first body 110a is switched between a first mode M1 (FIG. 1A) and a second mode M2 (FIG. 1B). The platform 300 is, for example, a desktop. The contours of the components in this embodiment are expressed in a variety of line types to facilitate visual recognition.

In this embodiment, the projector device 10a further includes an optical engine module 140 and a projection lens module 150, which are both arranged in the first body 110a. The optical engine module 140 and the projection lens module 150 are, for example, the optical system of the projector device 10a (FIG. 1C). The optical system may further optionally include a light source 210 and a light valve 220, where the light source 210 is configured to provide an illuminating beam L1, the optical engine module 140 is configured to transmit the illuminating beam L1 to the light valve 220, and the light valve 220 is configured to convert the illuminating beam L1 into a projection beam L2, and finally the projection lens module 150 is configured to adjust and project the projection beam L2 out of the projector device 10a. In other embodiments, the light engine module 140 for example, may include the light valve 220, and is suitable for providing the projection beam L2.

The light valve 220 is, for example, a reflective light modulator such as a liquid crystal on silicon panel (LCoS panel) and a digital micro-mirror device (DMD). In some embodiments, the light valve 220 may also be a transmissive optical modulator, such as a transparent liquid crystal panel, an electro-optical modulator, a magneto-optical modulator, or an acousto-optic modulator (AOM), etc. This disclosure does not limit the form and type of the light valve 220. The detailed process and implementation for the light valve 220 to convert the illuminating beam L1 into the projection beam L2 is obtained from general knowledge in the technical field with sufficient teaching, suggestion and implementation description, and therefore will not be repeated. In this embodiment, the number of light valves 220 is one, such as a projector device 10a using a single digital micro-mirror element, but in other embodiments there may be more than one light valves 220, and the present disclosure is not limited to this.

The projection lens module 150 includes, for example, a combination of one or more optical lenses with diopter, such as various combinations of non-planar lenses such as biconcave lenses, biconvex lenses, meniscus lenses, convex-concave lenses, plano-convex lenses, and plano-concave lenses. In an embodiment, the projection lens module 150 may further include a flat optical lens to project the projection beam L2 from the projection lens module 150 to the projection target in a reflective manner. The projection in this disclosure does not impose restrictions on the form and type of the projection lens module 150.

Figure 2A:
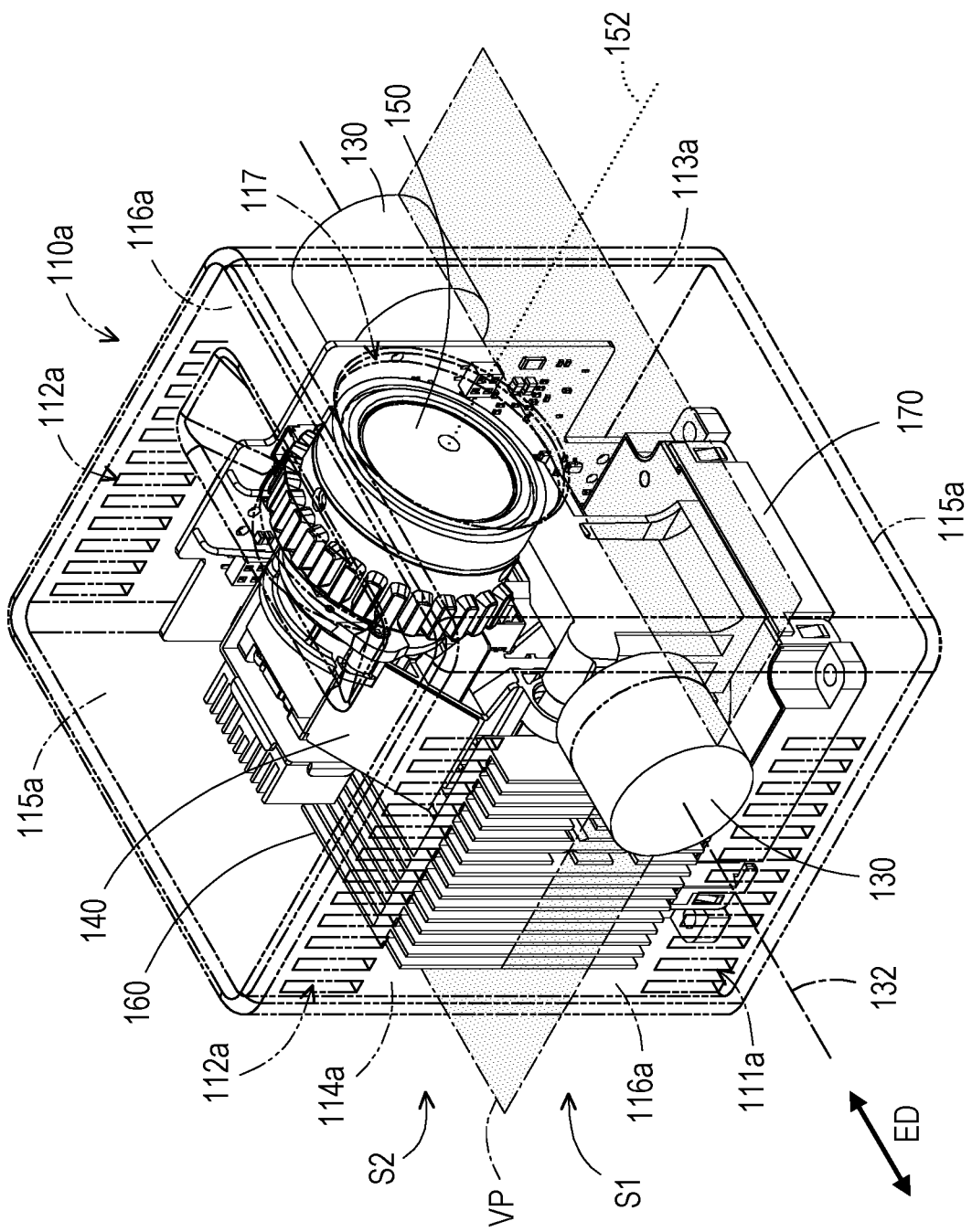
FIG. 2A is a schematic diagram of some components of the projector device of FIG. 1A.
Figure 2B:
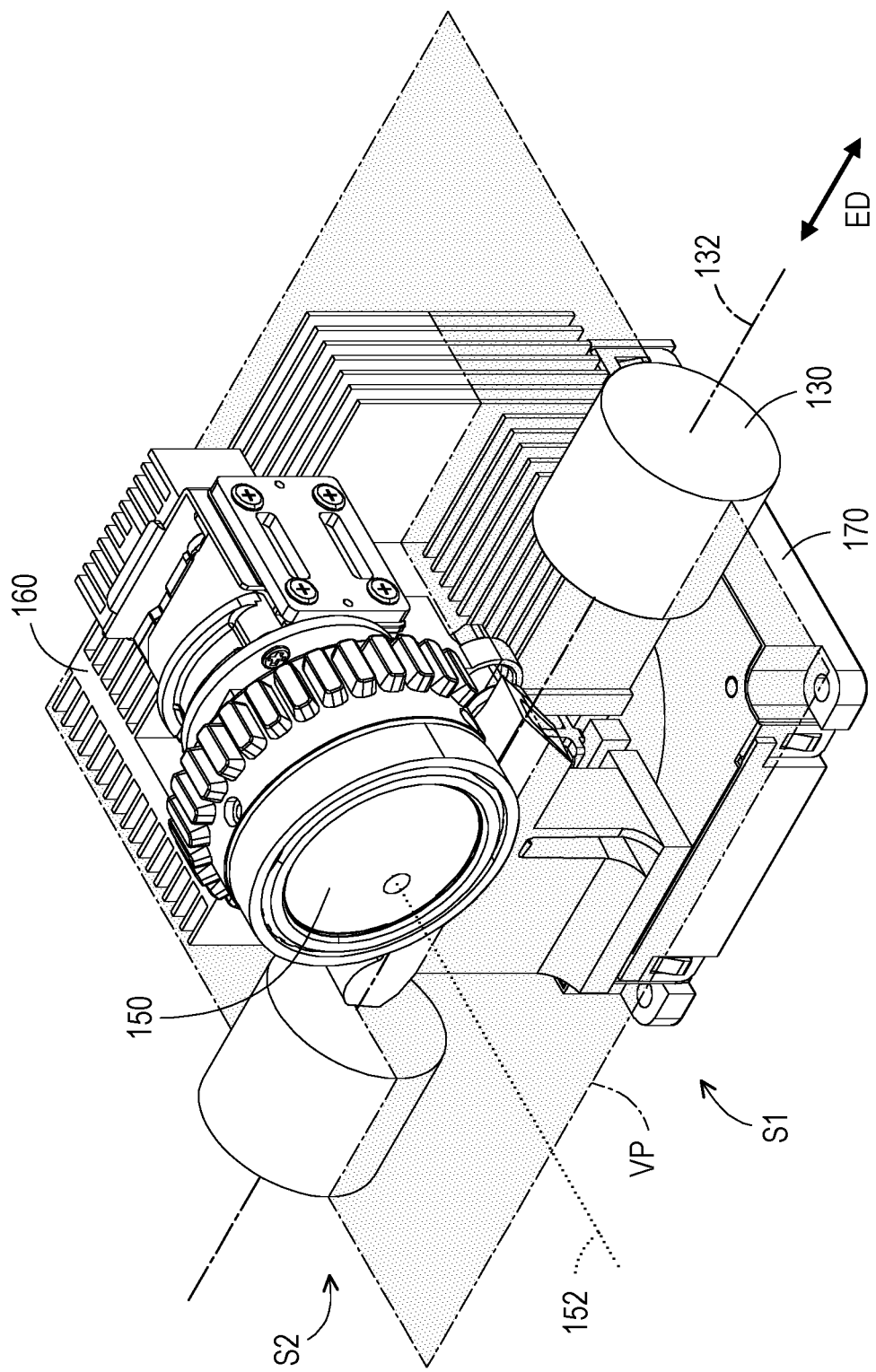
FIG. 2B is another schematic diagram of some components of the projector device of FIG. 2A.

FIG. 2A is a schematic diagram of some components of the projector device of FIG. 1A, in which the first body 110a is indicated by dashed lines to facilitate the identification of its internal structure. FIG. 2B is another schematic diagram of some components of the projector device of FIG. 2A. The first body 110a and some components are omitted in FIG. 2B. Referring to FIGS. 1A, 1B, 2A and 2B, the optical engine module 140 and the projection lens module 150 are respectively arranged and fixed in the first body 110a, and the projection lens module 150 has a projection optical axis 152, configured to project the projection beam L2 out of the first body 110a along the projection optical axis 152. For example, the projection optical axis 152 is parallel to the surface of the platform 300 in the first mode M1 shown. In the situation where the first body 110a rotates clockwise from the first mode M1 to the second mode M2 through the rotating shaft 130, the projection lens module 150 rotates with the first body 110a so that the projection optical axis 152 is perpendicular to the surface of the platform 300. In other words, the first body 110a is configured to be switched between the first mode M1 and the second mode M2, so that the projector device 10a of this embodiment can project toward the platform 300 (the second mode M2), or project toward a non-platform position (for example, the first mode MD so as to achieve a function of multi-angle projection.

Of course, the rotation direction and angle of the first body 110a is not limited to this embodiment. For example, in other embodiments, the first body 110a in the first mode M1 shown in FIG. 1A may be rotated in a counterclockwise direction, or a multistage mechanism may be provided so that the first body 110a may rotate at different angles. For example, the maximum rotation angle of the first body 110a is, for example, greater than or equal to 90 degrees, and the central axis of the rotating shaft 130 is, for example, parallel to the surface of the platform 300.

The projector device 10a of this embodiment further includes a multimedia module 180, which is arranged in the second body 120 and is electrically connected or in a message transmission relationship with the components in the first body 110a. The multimedia module 180 may provide image information to the optical system (for example, the optical engine module 140) in the body 110a, and the image information (the projection beam L2) is projected through the projection lens module 150. The multimedia module 180 may also be a player and/or a speaker, to richen the audiovisual effects produced by the projector device 10a, but the invention is not limited to the aforementioned.

The projector device 10a of this embodiment further includes a heat sink 160 and a fan 170, which are arranged in the first body 110a. The heat sink 160 and the fan 170 are configured for dissipating heat from the heat emanating elements (for example, the optical engine module 140 and the projection lens module 150) in the first body 110a. The rotating shaft 130 is located on a virtual plane VP, which is parallel to the projection optical axis 152. The virtual plane VP is configured to define the positions of the optical engine module 140, the projection lens module 150, the heat sink 160, and the fan 170.

Specifically, the first body 110a is a hexahedron, where the first body 110a has a front cover 113a, two side covers 116a, and a rear cover 114a orthogonal to the virtual plane VP, and the first body 110a also has two bottom covers 115a parallel to the virtual plane VP. The two side covers 116a are respectively bordered with the sides of the front cover 113a, and respectively extend from the sides of the front cover 113a to the sides of the rear cover 114a. The front cover 113a has an opening 117, in which the projection lens module 150 is exposed out of the first body 110a from the opening 117 of the front cover 113a.

As shown in FIG. 2B, the rotating shaft 130 is a cylindrical body, and its central axis 132 is located on the virtual plane VP, so that the rotating shaft 130 is located on the virtual plane VP. The projection optical axis 152 of the projection lens module 150 is parallel to the virtual plane VP and not parallel to the extension axis ED of the rotating shaft 130, in which the extension axis ED is, for example, parallel to the central axis 132. More specifically, the projection optical axis 152 of this embodiment is perpendicular to the extension axis ED of the rotating shaft 130.

The virtual plane VP includes a first side 51 and a second side S2 opposite to each other, and the first side S1 is located between the second side S2 and the second body 120 (FIG. 1A). The projection lens module 150 is located on the second side S2 of the virtual plane VP, so that the projection optical axis 152 is located on the second side S2 and does not intersect the central axis 132. At least one-half of the volume of the heat sink 160 and the fan 170 are located on the first side S1 of the virtual plane VP. The material of the heat sink 160 of this embodiment is homogeneous, and a center of gravity of the heat sink 160 is located in the geometric center region of the heat sink 160. The geometric center region of the heat sink 160 is a range within a specific distance from the geometric center of the heat sink 160. The specific distance is, for example, 10% of a width of the heat sink 160 (for example, a width along the direction perpendicular to the projection optical axis 152 and the central axis 132, which is not limited in the disclosure). The fan 170 of this embodiment is arranged beside the heat sink 160 and located at a side of the heat sink 160 away from the projection lens module 150, so that the fan 170 is away from the projection lens module 150.

Figure 2D:
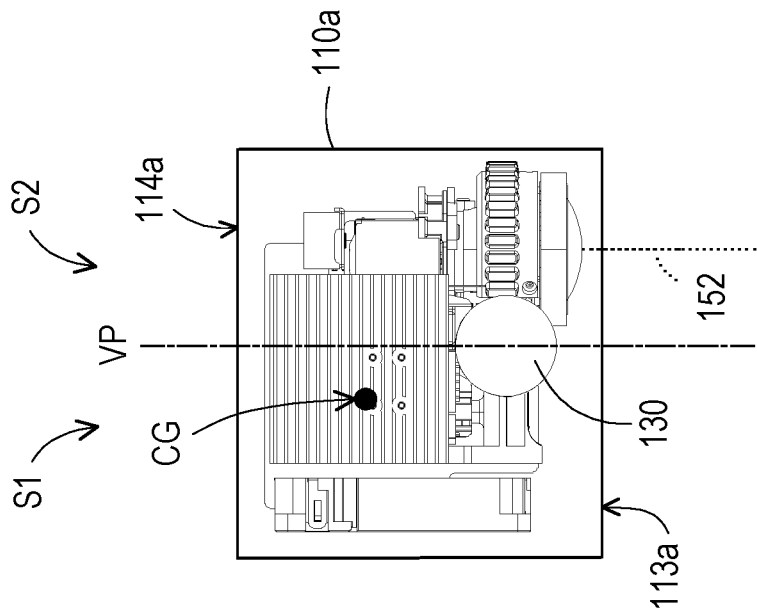
FIG. 2D is a side view of some components of the projector device of FIG. 2A in another state.
Figure 2C:
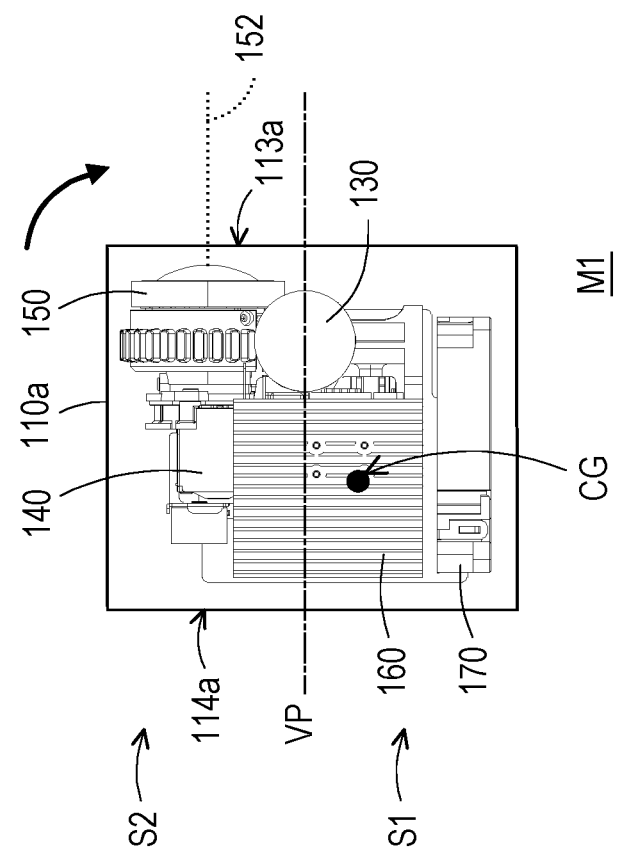
FIG. 2C is a side view of some components of the projector device of FIG. 2A.

FIG. 2C is a side view of some components of the projector device of FIG. 2A. FIG. 2D is a side view of some components of the projector device of FIG. 2A in another state. The first body 110a of FIG. 2C and FIG. 2D is shown in perspective view. FIG. 2C corresponds to FIG. 1A and shows part of the components of the projector device 10a in the first mode M1. FIG. 2D corresponds to FIG. 1B and shows part of the components of the projector device 10a in the second mode M2. Referring to FIGS. 2C and 2D, in this embodiment, the center of gravity formed by the first body 110a and all of the components arranged in the first body 110a is located on the first side S1 of the virtual plane VP. More specifically, since the weight of the heat sink 160 and the fan 170 is greater than the weight of the projection lens module 150, the center of gravity CG formed by the projection lens module 150, the heat sink 160, the fan 170 and the first body 110a of this embodiment is located on the first side S1 of the virtual plane VP (the weight of other components arranged in the first body 110a is relatively small, so their weight is not particularly considered).

In the situation where the first body 110a is switched between the first mode M1 (FIG. 2C) and the second mode M2 (FIG. 2D), the projection optical axis 152 and the virtual plane VP rotate with the first body 110a, so that the projection optical axis 152 remains parallel to the virtual plane VP, and the center of gravity CG is always on the first side 51 of the virtual plane VP. More specifically, as shown in FIGS. 1A and 1B, the orthographic projection of the center of gravity CG on the platform 300 is located within the range of the orthographic projection of the second body 120 on the platform 300, so that the projector device 10a stands stably on the platform 300 without tipping.

In short, the projector device 10a of this embodiment is provided via arrangement of the projection lens module 150, the heat sink 160, and the fan 170 in the first body 110a, so that the orthographic projection of the center of gravity CG of the first body 110a on the platform 300 does not exceed the range of orthographic projection of the second body 120 on the platform 300, thus enabling the projector device 10a to achieve stable multi-angle projection.

Returning to FIGS. 1A and 1C, in the situation where the image information of the multimedia module 180 is transformed to the projection beam L2 by the light source 210, the optical engine module 140, the light valve 220, and the projection lens module 150 arranged in the first body 110a, the aforementioned components may generate heat, raising the temperature of the aforementioned components and the interior of the first body 110a. Excessive heat energy may damage the internal components of the first body 110a and cause the projector device 10a to lose the projection function.

Referring to FIG. 2A at the same time, in order to avoid overheating and damage to the components, the heat sink 160 of this embodiment are arranged beside the optical engine module 140 or in direct contact to the optical engine module 140, where the heat sink 160 is configured to increase the heat dissipation surface area to accelerate heat dissipation. The fan 170 is configured to transfer the radiating heat energy (for example, the heat energy conducted to the heat sink 160) out of the first body 110a via blowing air, to cool down the first body 110a.

The first body 110a of this embodiment includes at least one air outlet 111a and at least one air inlet 112a. In this embodiment, the air outlet 111a and the air inlet 112a of the first body 110a are arranged on at least one side cover 116a of the first body 110a, but the invention is not limited thereto. The air inlet 112a is configured to allow an external air with low heat energy to flow into the first body 110a. The air outlet 111a is configured to allow an air with high heat energy in the first body 110a to flow outside of the first body 110a.

Thereby, a heat dissipation channel is formed between the air inlet 112a, the interior of the first body 110a, and the air outlet 111a. The air outside the first body 110a with low thermal energy enters the first body 110a through the air inlet 112a, and the air with low heat energy interacts with the internal components of the first body 110a to absorb heat to form an air with high thermal energy. Then, the air with high thermal energy is blown by the fan 170, and the air leaves the first body 110a through the air outlet 111a, so that the temperature of the first body 110a is lowered.

As shown in FIG. 2A, the air inlet 112a is located on the second side S2 of the virtual plane VP and the air outlet 111a is arranged on the first side S1 of the virtual plane VP. The air outlet 111a corresponds to the position of the fan 170, so that the fan 170 accelerates the discharge of the air with high heat energy, but the invention is not limited thereto.

FIG. 3A is a side view of some components of a projector device according to another embodiment of the invention. FIG. 3B is a side view of some components of the projector device of FIG. 3A in another state. Referring to FIGS. 3A and 3B at the same time, the first body 110b of this embodiment is similar to the first body 110a of the aforementioned embodiment, and the difference between the two is: the air outlet 111b of the first body 110b of this embodiment is located on a rear cover 114b of the first body 110b, and the projector device further includes a shielding member 190b, arranged on the first body 110b and adjacent to the air outlet 111b.

Specifically, in order to prevent external dust or particles from entering the first body 110b through the air outlet 111b in the situation where the first body 110b is in the second mode M2 (FIG. 3B), the shielding member 190b of the projector device in this embodiment extends outward from the rear cover 114b and is arranged beside the air outlet 111b, in which the air outlet 111b is adjacent to and connected between the fan 170 and the shielding member 190b, to block the external dust or particles. The shielding member 190b forms a flow channel 192b outside the air outlet 111b, in which the flow channel 192b is suitable for guiding the air to flow in a direction of an arrow shown in FIG. 3B, so that the air moves in a direction away from the virtual plane VP and leaves the first body 110b.

In short, the air outlet 111b of this embodiment is arranged on the rear cover 114b to prevent the air outlet 111b from being blocked by the bracket 122 of the second body 120 (FIG. 1A) and reducing the heat dissipation efficiency of the first body 110b. In addition, the first body 110b of the present embodiment is shielded from external dust by the shielding member 190b, and the flow channel 192b formed by the shielding member 190b allows the air with high thermal energy to quickly leave and stay away from the first body 110b to enhance the heat dissipation efficiency of the first body 110b.

Figure 4:
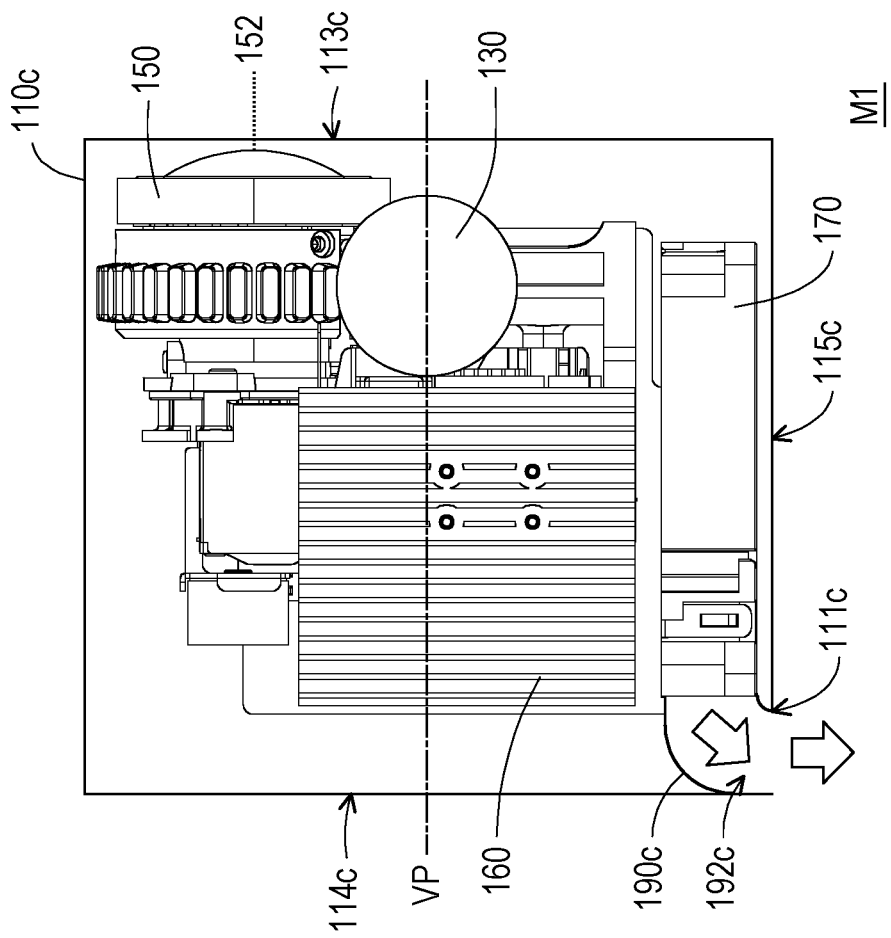
FIG. 4 is a side view of some components of a projector device according to another embodiment of the invention.

FIG. 4 is a side view of some components of a projector device according to another embodiment of the invention. Referring to FIG. 4, the first body 110c of this embodiment is similar to the first body 110b of the aforementioned embodiment, and the difference between the two is: the air outlet 111c of the first body 110c of this embodiment is located on a bottom cover 115c, and the shielding member 190c arranged inside the first body 110c is adjacent to and connected between the fan 170 and the air outlet 111c.

As shown in FIG. 4, the shielding member 190c forms a flow channel 192c in the first body 110c. The flow channel 192c of this embodiment is configured to connect an air outlet of the fan 170 and the air outlet 111c of the bottom cover 115c of the first body 110c, so that the air blown by the fan 170 flows in the direction of the arrow shown in FIG. 4 toward the bottom cover 115c of the first body 110c, in which the air leaves the first body 110c from the air outlet 111c, and lowers the temperature of the first body 110c.

In short, the shielding member 190c of this embodiment directly guides the air blown by the fan 170 to the outside of the first body 110c, so as to enhance the heat dissipation efficiency of the first body 110c. In addition, since the shielding member 190c is arranged inside the first body 110c, the shielding member 190c is not exposed to the outside and does not increase the external volume of the first body 110c.

In summary, the projector device of the invention is provided with arrangement of the heat sink and the fan, so that when the first body is switched between the first mode and the second mode, the center of gravity formed by the projection lens module, the heat sink, the fan and the first body is always located on the first side of the virtual plane, and the orthographic projection of the center of gravity on the platform is located within the range of the orthographic projection of the second body on the platform, therefore the projector device will not tip or become unstable. In the situation where the first body is rotated, the projection optical axis of the projection lens module is also rotated, and the projection beam is projected out of the first body along the direction of the projection optical axis, so that the projector device can achieve a function of stable multi-angle projection.

In addition, the first body further includes an air inlet and an air outlet to enhance the heat dissipation efficiency of the first body. The shielding member may be arranged on the first body and shield the air outlet to prevent external dust or particles from entering the first body. The shielding member may also form a flow channel on the outside or inside of the first body to enhance the heat dissipation efficiency of the first body.

The foregoing description of the preferred of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projector device, comprising:
   a first body;
   a second body, wherein the first body is stacked on the second body;
   a rotating shaft, connecting the first body and the second body, wherein the first body is rotated relative to the second body through the rotating shaft;
   an optical engine module, arranged in the first body for providing a projection beam;
   a projection lens module, arranged in the first body and having a projection optical axis for projecting the projection beam out of the first body along the projection optical axis, wherein the rotating shaft is located on a virtual plane, the first body is divided into a first space and a second space by the virtual plane, the virtual plane is parallel to the projection optical axis, and the projection optical axis is not parallel to the rotating shaft and is not located on the virtual plane; and
   a heat sink and a fan, arranged in the first body and beside the optical engine module, wherein the fan and at least one-half of the heat sink are arranged in the first space at a first side of the virtual plane, and the projection lens module is arranged in the second space at a second side of the virtual plane, wherein the first side and the second side are opposite sides of the virtual plane.

2. The projector device according to claim 1, wherein a center of gravity formed by the first body and a plurality of components arranged in the first body is located on the first side of the virtual plane, and the plurality of the components comprise the projection lens module, the heat sink, and the fan.

3. The projector device according to claim 2, wherein the second body stands on a platform and the first body is rotated relative to the second body to be switched between a first mode and a second mode, wherein in the first mode and in the second mode, an orthographic projection of the center of gravity formed by the first body and the plurality of components arranged in the first body on the platform is located within a range of an orthographic projection of the second body on the platform, wherein a direction of the projection optical axis relative to the platform in the first mode is different from a direction of the projection optical axis relative to the platform in the second mode.

4. The projector device according to claim 1, wherein the first side is located between the second side and the second body.

5. The projector device according to claim 1, wherein the second body further comprises a bracket, and the second body connects to the rotating shaft through the bracket.

6. The projector device according to claim 1, wherein the rotating shaft is a cylindrical body, and an extension axis of the rotating shaft is perpendicular to the projection optical axis.

7. The projector device according to claim 1, wherein the first body comprises at least one air outlet and at least one air inlet, located on the first side and the second side respectively.

8. The projector device according to claim 7, further comprising a shielding member, arranged on the first body and adjacent to the air outlet, the shielding member guides a direction of an air flow away from the virtual plane.

9. The projector device according to claim 8, wherein the first body comprises a front cover and a rear cover opposite to each other and both orthogonal to the virtual plane, the projection lens module is exposed from an opening of the front cover, the air outlet is located on the rear cover, the shielding member is located outside of the first body, and the air outlet is adjacent to and connected between the fan and the shielding member.

10. The projector device according to claim 8, wherein the first body comprises a front cover and a bottom cover bordered with each other, the front cover is orthogonal to the virtual plane, the bottom cover is parallel to the virtual plane, the projection lens module is exposed from an opening of the front cover, the air outlet is located on the bottom cover, and the shielding member located in the first body is adjacent to and connected between the fan and the air outlet.

11. The projector device according to claim 7, wherein the first body comprises a front cover and side covers, the front cover and the side covers are orthogonal to the virtual plane, the projection lens module is exposed from an opening of the front cover, the side covers are respectively bordered with a side of the front cover, and the at least one air outlet is located on at least one of the side covers.

12. The projector device according to claim 1, wherein the heat sink is homogeneous, and a center of gravity of the heat sink is located within a geometric center region of the heat sink.

13. The projector device according to claim 1, wherein the fan is located at a side of the heat sink away from the projection lens module.

14. The projector device according to claim 1, further comprising a multimedia module, arranged in the second body and configured to provide an image information to the optical engine module to produce the projection beam.

* * * * *